US011144891B1

(12) United States Patent
Ferrell (10) Patent No.: US 11,144,891 B1
(45) Date of Patent: ***Oct. 12, 2021

(54) CLOSED-LOOP SYSTEM AND METHOD FOR THE UTILIZATION OF RECYCLED POLYESTER FABRIC PRODUCTS

(71) Applicant: Purlin, LLC, Sarasota, FL (US)

(72) Inventor: Richard Francis Ferrell, Sarasota, FL (US)

(73) Assignee: Purlin, LLC, Sarasota, FL (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/861,006

(22) Filed: Jan. 3, 2018

Related U.S. Application Data (63) Continuation of application No. 15/096,925, filed on Apr. 12, 2016, now abandoned.
(Continued)

(51) Int. Cl.
  *G06Q 10/00* (2012.01)
  *G06Q 50/04* (2012.01)
  *G06Q 10/08* (2012.01)

(52) U.S. Cl.
  CPC .............. *G06Q 10/30* (2013.01); *G06Q 10/08* (2013.01); *G06Q 50/04* (2013.01)

(58) Field of Classification Search
  CPC ...................................................... G06Q 10/30
  See application file for complete search history.

(56) References Cited

U.S. PATENT DOCUMENTS 2,156,880 A   5/1939 Slomon
3,859,678 A   1/1975 Davis
(Continued)

FOREIGN PATENT DOCUMENTS

CA    2244227 A1 * 11/1999 ............. D02G 3/447
CN    1977774 A     6/2007
(Continued)

OTHER PUBLICATIONS

Potts et al., "Recycling for the Hospitality Industry A Guide for Instituting Recycling Programs in Hotel and Motel Properties", Clemson University, Extension, http://www.hcpcme.org/environment/hotel/hotelrecyclingguide.pdf, date of publication unknown however Reference V (EPA) shows at least Aug. 2011 (Year: 2011).*
(Continued)

*Primary Examiner* — Gerardo Araque, Jr.
(74) *Attorney, Agent, or Firm* — Reinhart Boerner Van Deuren P.C.

(57) ABSTRACT

A closed-loop system for the utilization of recycled woven and/or non-woven polyester fabric products in a plurality of high occupancy facilities includes at least one manufacturing facility to produce a plurality of recycled polyester fabric products from a recycled polyester fabric feedstock. A distribution network transports the plurality of recycled polyester fabric products to each of the plurality of high occupancy facilities, and a housekeeping network distributes and arranges recycled polyester fabric products in a plurality of rooms in a corresponding high occupancy facility. A collection network transports a plurality of compacted polyester fabric products from each of the plurality of high occupancy facilities back to the manufacturing facility. A corresponding closed-loop method for implementing the aforementioned closed-loop system is also disclosed.

19 Claims, 4 Drawing Sheets

Related U.S. Application Data (60) Provisional application No. 62/146,355, filed on Apr. 12, 2015.

(56) References Cited

U.S. PATENT DOCUMENTS

| | | | |
|---|---|---|---|
| 4,345,039 A | 8/1982 | Cowan et al. | |
| 5,072,833 A | 12/1991 | Hansen et al. | |
| 5,111,958 A * | 5/1992 | Witthoeft | B65F 1/006 |
| | | | 220/23.83 |
| 5,429,311 A * | 7/1995 | Cina | B03B 9/061 |
| | | | 241/14 |
| 5,433,390 A * | 7/1995 | Keeler | B09B 3/0058 |
| | | | 241/100 |
| 5,643,515 A | 7/1997 | Davies | |
| 5,665,300 A | 9/1997 | Brignola | |
| 5,789,328 A | 8/1998 | Kurihara et al. | |
| 5,919,717 A | 7/1999 | Wallick | |
| 6,037,282 A | 3/2000 | Milding et al. | |
| 6,063,717 A | 5/2000 | Ishiyama et al. | |
| 6,159,882 A | 12/2000 | Kean et al. | |
| 6,184,340 B1 * | 2/2001 | Smith | A01N 37/16 |
| | | | 528/480 |
| 6,305,920 B1 | 10/2001 | Kean et al. | |
| 6,378,179 B1 | 4/2002 | Hirsch | |
| 6,475,315 B1 | 11/2002 | Kean et al. | |
| 6,953,119 B1 | 10/2005 | Wening | |
| 7,060,211 B2 | 6/2006 | Oda | |
| 7,419,058 B2 | 9/2008 | Wening | |
| 7,635,099 B1 | 12/2009 | Meredith et al. | |
| 7,767,141 B2 | 8/2010 | Andersson | |
| 7,784,399 B2 | 8/2010 | Sasine et al. | |
| 2002/0002764 A1 | 1/2002 | Putnam | |
| 2002/0132960 A1 * | 9/2002 | Haile | A61L 15/225 |
| | | | 528/272 |
| 2003/0003249 A1 | 1/2003 | Benim | |
| 2003/0157854 A1 | 8/2003 | Miller et al. | |
| 2005/0020171 A1 | 1/2005 | Yoshida et al. | |
| 2005/0079521 A1 | 4/2005 | Putnam et al. | |
| 2006/0075896 A1 | 4/2006 | Andersson | |
| 2008/0014817 A1 | 1/2008 | Zafiroglu | |
| 2008/0305134 A1 | 12/2008 | Lucas | |
| 2009/0173055 A1 | 7/2009 | Silver | |
| 2010/0092746 A1 | 4/2010 | Coant | |
| 2010/0203788 A1 | 8/2010 | Kimura et al. | |
| 2011/0200807 A1 | 8/2011 | Shofner et al. | |
| 2012/0060283 A1 | 3/2012 | Campasano | |
| 2014/0081877 A1 * | 3/2014 | Londergan | G06Q 30/018 |
| | | | 705/317 |
| 2015/0123304 A1 | 5/2015 | Ashraf et al. | |
| 2015/0291762 A1 * | 10/2015 | Watanabe | A61F 13/15707 |
| | | | 428/401 |
| 2016/0283917 A1 * | 9/2016 | Nunn | G06Q 10/30 |

FOREIGN PATENT DOCUMENTS

| | | | | |
|---|---|---|---|---|
| EP | 0672593 A2 * | 9/1995 | | B65D 75/08 |
| JP | H07-258939 A | 10/1995 | | |
| JP | H09-299192 A | 11/1997 | | |
| JP | 2007-254904 A | 10/2007 | | |
| TR | 201401076 U | 8/2015 | | |
| WO | WO 2013/182801 A1 | 12/2013 | | |
| WO | WO 2016/083667 A1 | 6/2016 | | |

OTHER PUBLICATIONS

EPA, "EIA Technical Review Guidelines: Tourism-Related Projects," Aug. 2011, vol. 1, https://www.epa.gov/sites/production/files/2014-04/documents/tourismvol1.pdf (Year: 2011).*

Doubletex, "Blankets made from recycled fibers," Doubletex, Archive date of Jan. 10, 2012, https://web.archive.org/web/20120110142207/http://www.doubletex.com/main.aspx?p=19&l=en (Year: 2012).*

Michael Kanellos, "Eucalyptus Sheets and Recycled Plastic Thread: Greening the Hotel," Greentech Media, Oct. 2009, https://www.greentechmedia.com/articles/read/eucalyptus-sheets-and-recycled-plastic-curtains-greening-the-hotel#gs.gz_g1Cc (Year: 2009).*

O Ecotextiles, "Is recycled polyester fabric Recyclable?", O Ecotextiles, Jan. 31, 2010, https://web.archive.org/web/20100131093409/https://oecotextiles.wordpress.com/2009/11/11/is-recycled-polyester-fabric-recyclable/ (Year: 2010).*

Sophia Bennett, "How to Recycle Fabric," May 22, 2014, Recycle Nation, https://recyclenation.com/2014/05/recycle-fabric (Year: 2014).*

Elizabeth Claire Alberts, "Recycled Plastic Clothing: Solution or Threat?," Earth Island Journal, Dec. 15, 2014, http://www.earthisland.org/journal/index.php/articles/entry/recycled_plastic_clothing_solution_or_threat/ (Year: 2014).*

Orchard garden hotel wins LEED certification. (Jun. 26, 2007). Business Wire Retrieved from https://dialog.proquest.com/professional/docview/673411638?accountid=131444 (Year: 2007).*

Pure Process, The Refreshing difference of PURE, www.pureroom.com/pure_process, 1 page, Feb. 1, 2017.

Behind Pureroom, PURE's Patented, 7-Step Purification Process, www.pureroom.com/pure_process/behind_pureroom, 1 page, Feb. 1, 2017.

Pure at Home, Live the PURE Life, www.pureroom.com/pure_home, 3 pages, Feb. 1, 2017.

Kharpal, Arjun, Amazon wins patent for a flying warehouse that will deploy drones to deliver parcels in minutes, www.cnbc.com/2016/12/29/amazon-flying-warehouse-deploy-delivery-drones-patent.html, 4 pages, Dec. 30, 2016.

U.S. Appl. No. 15/096,925, filed Apr. 12, 2016, Ferrell.
U.S. Appl. No. 15/469,124, filed Mar. 24, 2017, Wahlquist.
U.S. Appl. No. 16/256,803, filed Jan. 24, 2019, Ferrell et al.

* cited by examiner

CLOSED-LOOP SYSTEM AND METHOD FOR THE UTILIZATION OF RECYCLED POLYESTER FABRIC PRODUCTS

BACKGROUND OF THE INVENTION

Field of the Invention

The present invention is directed to a closed-loop system for the utilization of recycled polyester fabric products, such as, by way of example only, bed sheets, pillow cases, bath linens, including bath towels, hand towels, wash cloths, bath mats, etc., in high occupancy facilities such as, once again, by way of example only, hotels, motels, dormitories, hospitals, nursing homes, prisons, etc. The recycled polyester fabric products include both woven and non-woven polyester fabric products. The present invention is further directed to a method of utilizing recycled polyester fabric products in high occupancy facilities.

Description of the Related Art

The current global water crisis is jeopardizing the quality of twenty-first century life. In many regions throughout the United States including California, Texas and Arizona, human demand for fresh water exceeds available supply. In order to establish a more sustainable scenario, we must reduce frivolous water consumption by identifying wasteful redundancies and creating water-conserving solutions. To that end, the present invention addresses the significant amounts of water consumed annually by high occupancy facilities, such as, by way of example, hotels, motels, resorts, dormitories, hospitals, nursing homes, prisons, etc.

Figure 1:
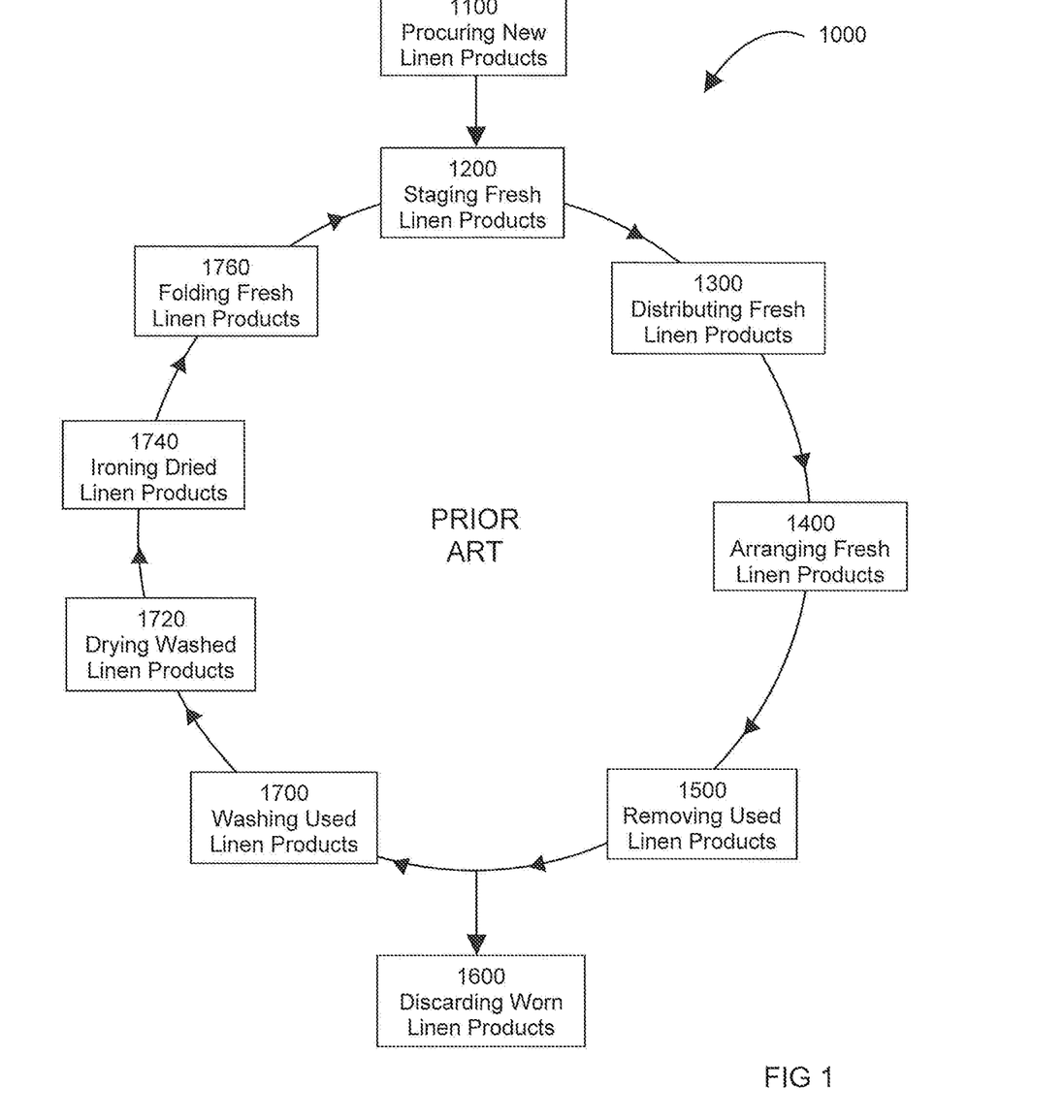
FIG. 1 a diagrammatic representation of one embodiment of a currently practiced Prior Art method for utilizing linen products in a high occupancy facility.

FIG. 1 is illustrative of the current or prior art practice for utilizing linen products in one or more high occupancy facility, such as is shown as 1000. As may be seen from FIG. 1, the currently practiced method 1000 requires procuring new linen products 1100. Linen products, as used herein, include bedsheets and pillowcases, but may also include blankets, covers, comforters, etc. Linen products may also include bath linens, such as, bath towels, hand towels, wash cloths, bath mats, etc. The new linen products may be purchased at the onset of operation of one or more high occupancy facilities, such as, by way of example, hotels, motels, dormitories, hospitals, nursing homes, prisons, etc. The step of procuring new linen products 1100 also occurs periodically as worn or damaged linen products are discarded, as discussed below. Regardless, procuring new linen products 1100 represents a considerable cost to the operation of any high occupancy facility.

Following procurement 1100, high occupancy facilities currently stage fresh linen products 1200, whether new or obtained from onsite or offsite laundry facilities, onto one or more delivery carts to facilitate distribution of the fresh linen products throughout the high occupancy facility. Current practices also include distributing fresh linen products 1300 to each of a plurality of rooms within a high occupancy facility. As noted above, one or more delivery carts are typically used to facilitate distribution of fresh linen products 1300 to a plurality of rooms in a high occupancy facility.

The current practice for utilizing linen products in a high occupancy facility 1000 also includes arranging fresh linen products 1400 in each of a plurality of rooms of the high occupancy facility. More in particular, one or more members of a housekeeping staff would place fresh linen sheets and pillowcases on a bed or beds. In at least some instances, arranging fresh linen products 1400 also includes placing fresh bath linens, including bath towels, hand towels, wash cloths, bath mats, etc., in the bathroom(s) in each of a plurality of rooms of a high occupancy facility. The current method 1000 also includes the step of removing used linen products 1500 from each of the plurality of rooms of a high occupancy facility, typically, following use by one or more guest or other occupant. As will be appreciated, this step of removing used linen products 1500 may include stripping a bed or beds of sheets, blankets, comforters, pillowcases, etc. As before, current practice also includes removing used bath linens, including bath towels, hand towels, wash cloths, bath mats, etc., from one or more bathrooms in a plurality of rooms of a high occupancy facility.

As noted above, over time and through use, linen products become worn or damaged and must be replaced. As such, the current method 1000 for utilizing linen products in a high occupancy facility further includes the step of discarding worn or damaged linen products 1600, shown in FIG. 1. Linen products that are not discarded, must be laundered in order to return them to a clean, fresh state for reuse. Therefore, the present method for utilizing linen products in a high occupancy facility 1000 includes the step of washing used linen products 1700, as shown in FIG. 1. As noted above, washing used linen products 1700 typically occurs in a laundry which is present on site at a high occupancy facility. In some instances, an offsite laundry facility may be utilized, in which case, an additional step of transporting used linen products to an offsite laundry and returning fresh, clean linen products to the high occupancy facility would be required.

It is noteworthy that commercial laundries, such as those utilized for high occupancy facilities, use chemical injection systems which add chemicals that are much stronger and harsher than those typically encountered in the standard detergents and bleaches used in residential washing machines. This is necessary to assure proper sanitation of the bed sheets, pillow cases, etc. More in particular, these harsh chemicals are used to kill germs and bacteria, as well as to kill and prevent occurrences of bedbugs, lice, and other such pests. Unfortunately, many people are allergic to these harsher chemicals, and while some are only mildly affected, others have reported severe outbreak of rashes and the like, and in some cases, these outbreaks have been attributed to unsanitary facilities and/or bedbugs.

With reference once again to the prior art methodology illustrated in FIG. 1, the currently practiced method 1000 further includes drying washed linen products 1720, after washing the used linen products 1700. The currently practiced method 1000 includes ironing dried linen products 1740, however, it is noted this step of ironing typically would apply only to bedsheets and pillowcases, and not necessarily where the linen products include bath linens, such as, bath towels, hand towels, wash cloths, bath mats, etc. After ironing the dried linen products 1740, the currently practiced method for utilizing linen products in high occupancy facilities 1000 includes the step of folding the fresh linen products 1760, once again, as shown on FIG. 1. After folding the fresh linen products 1760, the present method repeats with staging fresh linen products 1200 onto one or more delivery cart for distribution to the plurality of rooms within a high occupancy facility.

As may be seen from the foregoing, and as will be appreciated by those of skill in the art, the currently practiced method of utilizing linen products in high occupancy facilities 1000 is both costly and labor intensive. Further, and as is discussed in detail with reference to FIGS. 3 and 4, and the tables presented below, the amount of water required to implement the currently practiced method 1000 is astronomical, even for a moderately sized high occupancy facility.

As such, it would be highly beneficial to provide a cost effective alternative to the current practice of utilizing linen products, such as, cotton bed sheets and pillow cases, in high occupancy facilities. It would also be helpful to provide an alternative which reduces the amount of labor required by housekeeping staff or outside facilities to launder such linen products for a high occupancy facility. A further advantage may be realized by providing an alternative to the current practice for utilizing such linen products at a high occupancy facility that substantially reduces the water requirements associated therewith. Yet a further benefit may be realized by providing an alternative to linen products, such as, cotton bed sheets and pillow cases, which are truly hypoallergenic.

SUMMARY OF THE INVENTION

As stated above, the present invention is directed to a closed-loop system for the utilization of polyester fabric products in a plurality of high occupancy facilities. In at least one embodiment, the present closed-loop system includes at least one manufacturing facility to manufacture a plurality of recycled polyester fabric products from a recycled fabric feedstock. In accordance with at least one embodiment of the present invention, the recycled polyester fabric products include both woven and non-woven polyester fabric products, as discussed in greater detail below. A distribution network is provided in at least one further embodiment, to transport a plurality of recycled polyester fabric products to each of a plurality of high occupancy facilities.

At least one embodiment of the present closed-loop system further comprises a housekeeping network in each of the plurality of high occupancy facilities to distribute recycled polyester fabric products to each of a plurality of rooms in a corresponding high occupancy facility, and to arrange the recycled polyester fabric products in each of the plurality of rooms. At least one dedicated collection assembly is provided at each of the plurality of high occupancy facilities, in accordance with one embodiment, to segregate a plurality of used polyester fabric products generated at each of the plurality of high occupancy facilities The present closed-loop system, in yet one further embodiment, includes a collection network to transport a plurality of segregated used polyester fabric products from each of the plurality of high occupancy facilities back to the manufacturing facility.

The present invention is also directed to a closed-loop method for utilizing recycled polyester fabric products in a high occupancy facility. In accordance with one embodiment of the present invention, a closed-loop method for utilizing recycled polyester fabric products in a high occupancy facility includes: procuring a plurality of recycled polyester fabric products which, once again, includes both woven and non-woven polyester fabric products; distributing the plurality of recycled polyester fabric products to a plurality of rooms in the high occupancy facility; removing a plurality of used polyester fabric products from the plurality of rooms; segregating the plurality of used polyester fabric products; recycling the plurality of segregated used polyester fabric products; and, manufacturing a plurality of recycled polyester fabric products from the plurality of used polyester fabric products.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 2:
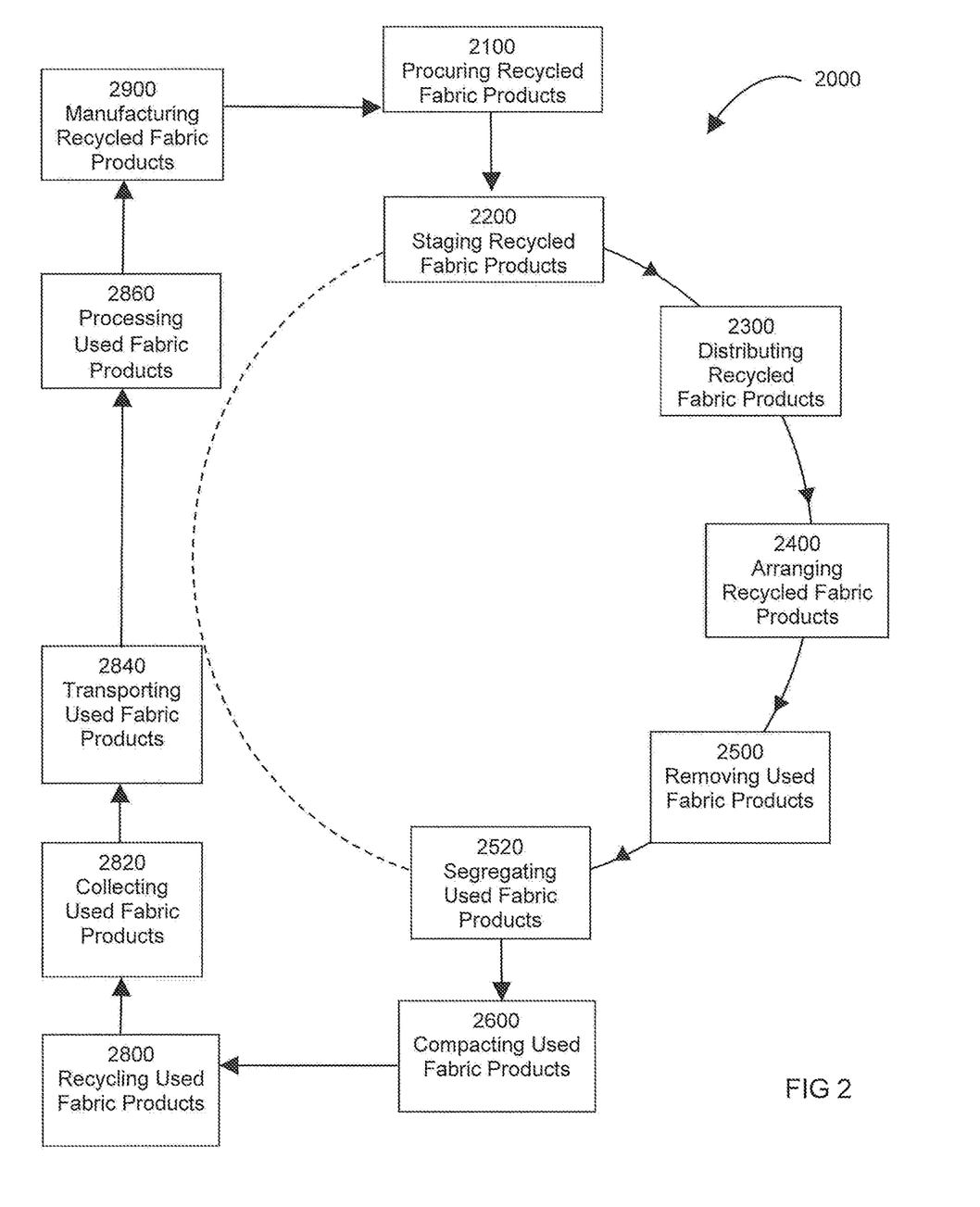
FIG. 2 a diagrammatic representation of one illustrative embodiment of a method for utilizing recycled polyester fabric products in a high occupancy facility in accordance with the present invention.

As previously indicated, the present invention is directed to a method of utilizing recycled polyester fabric products in high occupancy facilities, such as is generally shown as 2000 in the illustrative embodiment of FIG. 2. The present invention is further directed to a closed-loop system for the utilization of recycled polyester fabric products, such as is generally shown as 5000 in the illustrative embodiment of FIG. 3.

Beginning with reference to the illustrative embodiment of FIG. 2, the present method 2000 includes procuring recycled polyester fabric products 2100. In one embodiment, polyester fabric products, as used herein, include bed sheets and pillow cases. However, in at least one other embodiment, polyester fabric products includes blankets, covers, comforters, etc., and in yet one further embodiment, polyester fabric products also include bath linens, such as, bath towels, hand towels, wash cloths, bath mats, etc. In still other embodiments, recycled products include such items as table cloths, napkins, etc.

As used herein, it is understood that "polyester fabric product" include both woven and non-woven polyester fabric products. In general, woven polyester fabric products are formed by gathering fibers into threads which are then woven into fabric, whereas non-woven polyester fabric products are formed by hydroentanglement to form fibers into a fabric.

More in particular, in at least one embodiment, the process of forming woven polyester fabric products begins with bailed fibers, and cards the fibers into one direction in a loose bundle or tow. The bundle of loose fibers is then subjected to yarn spinning where individual fibers are twisted together into continuous yarns. In one alternative embodiment, the process may utilize continuous polyester filaments. The fibers or filaments are then bound together by weaving in web and warp directions to form a fabric.

With regard to non-woven polyester fabric products, the process utilizes loose mats of carded fibers which are mechanically entangled together into a fabric via high pressure water jets in a process known as hydroentanglement.

Moreover, a variety of recyclable fabric materials may be utilized in accordance with the present method 2000. In at least one embodiment, the recycled polyester fabric products are manufactured from spunlace polyester. In at least one further embodiment, the spunlace polyester is hypoallergenic. In still one further embodiment, the spunlace polyester is hypoallergenic, fragrance free, and replicates the look and feel of quality cotton fabric.

As will be appreciated by those of skill in the art, polyester is available in a wide variety of forms including, by way of example only: polyester produced from petroleum derivatives; polyester produced from plant based feedstocks, such as, polylactic acid ("PLA"); polyester thread; low melting point polyester tape; recycled polyester produced by refiberizing nonwoven or textile waste or produced by remelting and extruding fibers from other polyester materials, such as, fiber or bottle flake; round and shaped, i.e. trilobal fibers; small fibers; large fibers; polypropylene fibers; polyethylene fibers; nylon; etc. In one embodiment, polyester fibers in a range of about 10 millimeters to 40 millimeters in length are utilized to manufacture non-woven polyester fabric products in accordance with the present invention.

In at least one embodiment, recycled polyester fabric products are manufactured from polyester fibers in a range of about 0.9 to about 20 denier, to affect properties such as opacity, wicking, breathability, stiffness, drape, etc. In one other embodiment, polyester fibers may be treated with one or more additives to improve wettability and allow the polyester fabric products to wick moisture. In yet one further embodiment, one or more additives are extruded with the polyester fibers, and in another embodiment, one or more additives are added via a topical treatment.

In yet another embodiment, polyester fabric products are manufactured from bi-component fibers, i.e., fibers that contain two components, one of which may be polyester and the other a polymer of lower melting point, such as, low melt polyester, polypropylene or polyethylene. Still one further embodiment utilizes a cellulosic fiber as an additive to aid in processing or moisture control or aesthetic properties, wherein cellulosic fibers include, but are not limited to, cotton, viscose, lyocell, bamboo, flax, hemp, and wood pulp.

In addition to spunlace polyester, it is within the scope and intent of the present invention to manufacture polyester fabric products via other processes, such as, by way of example only: spunbonded; spunbonded/meltblown laminates; needle punch; airlaid; wetlaid; etc.

Furthermore, while processing used polyester fabric products 2860, as discussed in further detail below, the recycled fabric feedstocks are exposed to temperatures in excess of 340° Fahrenheit, which is more than sufficient to kill any germs or bacteria, thereby eliminating the need for the detergents, bleaches, and/or other cleaning or sanitizing chemicals which are in prevalent use in institutional laundries worldwide.

Procuring recycled polyester fabric products 2100, once again, including both woven and no-woven recycled polyester fabric products, may occur at the onset of operation of one or more new high occupancy facilities, such as, once again, by way of example, hotels, motels, dormitories, hospitals, nursing homes, prisons, etc. For example, a complete 3-par supply may be procured for the facility, i.e., three complete sets of bed sheets and pillow cases for each bed in the facility. Moreover, in accordance with the present method 2000, procuring recycled polyester fabric products 2100 is a reoccurring task as part of the closed-loop system 5000, which is discussed in greater detail below with reference to FIG. 3.

After procuring recycled polyester fabric products 2100, at least one embodiment of the present method 2000 includes staging recycled polyester fabric products 2200 in preparation for distribution throughout a high occupancy facility. In at least one embodiment, staging recycled polyester fabric products 2200 includes stocking one or more delivery carts with recycled polyester fabric products to facilitate distribution of the polyester fabric products throughout a corresponding high occupancy facility. The present method 2000 also includes distributing recycled polyester fabric products 2300 to each of a plurality of rooms within a high occupancy facility. As before, one or more delivery carts are typically used to facilitate distribution of recycled polyester fabric products 2300 to a plurality of rooms in a high occupancy facility.

The present method for utilizing recycled polyester fabric products in a high occupancy facility 2000, in at least one embodiment, further includes arranging recycled products 2400 in each of a plurality of rooms of the high occupancy facility. More in particular, one or more members of a housekeeping staff would place recycled fabric bed sheets and pillow cases on a bed or beds in each room in preparation for the next occupant or occupants. In at least one further embodiment, arranging polyester fabric products 2400 also includes placing recycled bath linens, including bath towels, hand towels, wash cloths, bath mats, etc., in the bathroom(s) in each of a plurality of rooms of a high occupancy facility, once again, in preparation for the next occupant or occupants.

The present method 2000 also includes removing used recycled polyester fabric products 2500 from each of the plurality of rooms of a high occupancy facility. Typically, this follows use by one or more guest or other occupant, however, it may also occur intermittently while the same guest or occupant is at the facility. As will be appreciated, removing used recycled polyester fabric products 2500 may include stripping a bed or beds of sheets, pillow cases, blankets, comforters, etc. In at least one embodiment, removing used recycled polyester fabric products 2500 includes removing used bath linens, including bath towels, hand towels, wash cloths, bath mats, etc., from the bathroom(s) of a plurality of rooms of a high occupancy facility. A plurality of collection carts may be utilized to facilitate removing used recycled polyester fabric products 2500 from each of the plurality of rooms of a high occupancy facility.

In at least one embodiment, the present method 2000 includes segregating used recyclable polyester fabric products 2520 which are removed from each of the plurality of rooms of a high occupancy facility. In one embodiment, the used recyclable polyester fabric products are segregated at the time they are removed from each room, and are placed directly into a designated collection cart. In at least one embodiment, a plurality of designated collection carts are employed to facilitate segregating used recyclable polyester fabric products 2520. By way of example, one collection cart may be designated for lightweight recycled polyester fabric products, such as, by way of example, recycled bed sheets, pillow cases, etc., while another collection cart may be designated for heavier recycled polyester fabric products, such as, once again, by way of example only, bath linens, including bath towels, hand towels, wash cloths, bath mats, etc.

In at least one embodiment, removing used recycled polyester fabric products 2500 from each of the plurality of rooms of a high occupancy facility includes removing both used recycled polyester fabric products along with certain other products, such as, for example, linen products. As such, in at least one embodiment, segregating used recyclable polyester fabric products 2520 occurs after the fact in a central location, such as, in a laundry located at the facility wherein used recyclable polyester fabric products are segregated from other products, which may require laundering or disposal.

With reference once again to the illustrative embodiment of FIG. 2, in at least one embodiment, the present method for utilizing recycled polyester fabric products in a high occupancy facility 2000 also includes compacting recyclable polyester fabric products 2600. As described in greater detail below with reference to the present inventive closed-loop system 5000 in the illustrative embodiment of FIG. 3, at least one dedicated compactor is employed to compact used recyclable polyester fabric products. More in particular, in at least one embodiment, compacting recyclable polyester fabric products 2600 is implemented via a dedicated compactor located at either a high occupancy facility or a designated manufacturing facility or both, so as to prevent contamination of the used recyclable polyester fabric products, and to assure purity of the recycled fabric feedstocks obtained therefrom. In at least one further embodiment, encoded compactor bags 5820 are utilized in dedicated compactors for compacting recyclable polyester fabric products 2600, such that the source, type, quantity, etc., of the compacted used polyester fabric products contained in any particular compactor bag can be readily ascertained, once again as discussed in greater detail below with reference to the present closed-loop system 5000.

The present method for utilizing recycled polyester fabric products in a high occupancy facility 2000 comprises, as the name implies, recycling used polyester fabric products 2800, as shown in the illustrative embodiment of FIG. 2. More in particular, in at least one embodiment, the present method 2000 employs recycling used polyester fabric products 2800 which are collected from a plurality of high occupancy facilities. In still one further embodiment, the present method 2000 employs recycling used polyester fabric products 2800 which are obtained from a plurality of high occupancy facilities which form a closed-loop network of facilities which procure recycled polyester fabric products from a designated manufacturing facility, and which return used fabric materials to the same designated manufacturing facility for recycling, once again, to maintain purity and consistency of the recycled fabric feedstocks.

With reference once again to the illustrative embodiment of FIG. 2, the present method for utilizing recycled polyester fabric products in a high occupancy facility 2000 further comprises collecting used polyester fabric products 2820 a high occupancy facility. As noted above, in at least one embodiment, the present method 2000 includes collecting used polyester fabric products 2820 from a plurality of high occupancy facilities, and in one further embodiment, the present method comprises collecting used polyester fabric products 2820 from a plurality of high occupancy facilities which form a closed-loop network.

The present method 2000 further comprises transporting used recyclable polyester fabric products 2840 to a designated manufacturing facility for further processing to form recycled fabric feedstocks from which new recycled products are manufactured. In at least one embodiment, an existing recycling service provider may be utilized for collecting a plurality of used polyester fabric products 2820 from a plurality of high occupancy facilities, and transporting the plurality of used polyester fabric products 2840 to one or more designated manufacturing facilities.

Looking once again to the illustrative embodiment of FIG. 2, the present method 2000 also includes processing used polyester fabric products 2860 to produce recycled fabric feedstocks for the manufacture of new polyester fabric products. More in particular, in at least one embodiment, processing used polyester fabric products 2860 includes: sizing used polyester fabric products, i.e., cutting used products into smaller sized pieces for further processing; heat treating to kill bacteria, germs, and other contaminants; separating fibers for subsequent reuse; etc. In at least one embodiment, processing used polyester fabric products 2860 to produce recycled fabric feedstocks for the manufacture of new recycled polyester fabric products includes finely separating the used polyester fabric products into individual fibers for reuse in processes such as, but not limited to, carding, spunlacing, needle punching, spinning, weaving, etc., just to name a few.

The present method for utilizing recycled polyester fabric products in a high occupancy facility 2000 further comprises manufacturing new recycled polyester fabric products 2900 from the used recycled fabric feedstocks. As before, and by way of example only, the recycled polyester fabric products may include bed sheets, pillow cases, bath linens, including bath towels, hand towels, wash cloths, bath mats, etc. As may be seen from the illustrative embodiment of FIG. 2, the high occupancy facilities procure new recycled polyester fabric products 2100 from a designated manufacturing facility, thereby forming a closed-loop of manufacture, use, and recycle of polyester fabric products in accordance with at least one embodiment of the present method 2000.

Figure 3:
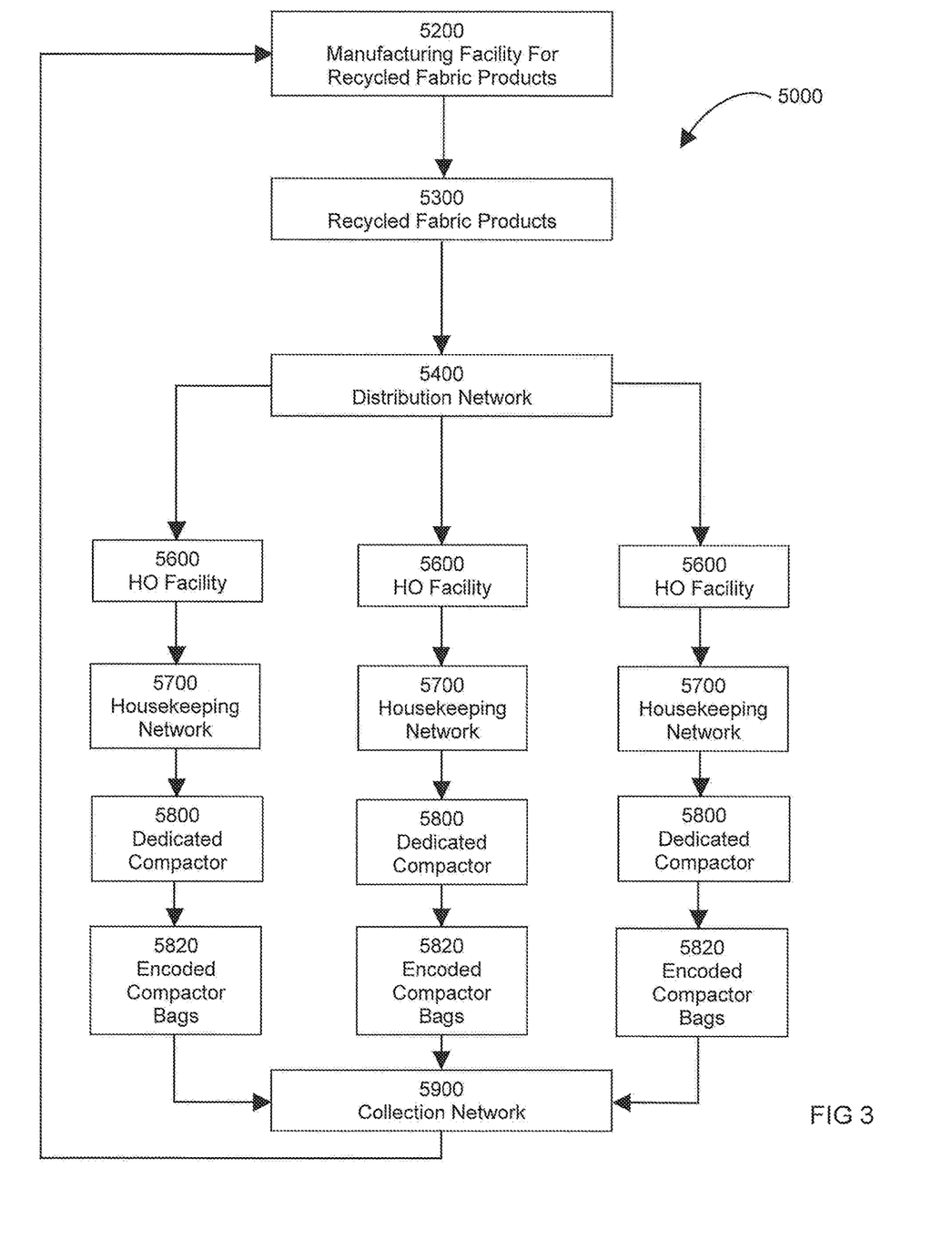
FIG. 3 is a schematic representation of one illustrative embodiment of a closed-loop system for the utilization of recycled polyester fabric products in a plurality of high occupancy facilities in accordance with the present invention.

As previously stated, the present invention is also directed to a closed-loop system for the utilization of recycled polyester fabric products in a high occupancy facility such as is shown in 5000 in FIG. 3. The present closed-loop system includes at least one designated manufacturing facility 5200 to manufacture recycled polyester fabric products. As before, the recycled polyester fabric products include both woven and non-woven polyester fabric products. More in particular, the designated manufacturing facility 5200 utilizes a consistent and controlled recycled fabric feedstock to manufacture a plurality of new recycled polyester fabric products 5300. As before, in at least one embodiment of the present closed-loop system 5000, recycled polyester fabric products 5300 comprises bedding, such as, bed sheets and pillow cases. In one further embodiment, recycled polyester fabric products 5300 include bath linens, such as, bath towels, hand towels, wash cloths, bath mats, etc. As will be appreciated by those of skill in the art, it is within the scope and intent of the present invention for recycled polyester fabric products 5300 to encompass other commonly utilized articles in high occupancy facilities, such as, table cloths, napkins, etc.

With reference once again to the illustrative embodiment of FIG. 3, a closed-loop system for the utilization of recycled polyester fabric products in a high occupancy facility 5000 includes a distribution network 5400. More in particular, a distribution network 5400 transports a plurality of recycled polyester fabric products 5300 from one or more designated manufacturing facilities 5200 to each of a plurality of high occupancy facilities 5600 for use therein. In at least one embodiment, a distribution network 5400 comprises the shipping facilities, local and over the road trucks, etc., of a designated manufacturing facility 5200 for recycled polyester fabric products 5300. In at least one further embodiment, a distribution network 5400 comprises one or more independent transportation providers to facilitate the distribution of a plurality of recycled polyester fabric products 5300 to each of a plurality of high occupancy facilities 5600 located within a distribution network for a designated manufacturing facility 5200, such as, by way of example, a national hotel supply company.

With reference once again to FIG. 3, at least one embodiment of a closed-loop system for the utilization of polyester fabric products in a high occupancy facility 5000 comprises a housekeeping network 5700, and in one further embodiment, each of a plurality of high occupancy facilities 5600 has a housekeeping network 5700 corresponding thereto. More in particular, a housekeeping network 5700 includes housekeeping personnel, and housekeeping equipment, such as, delivery carts for new recycled polyester fabric products, collection carts for used polyester fabric products, among other resources. In operation, each housekeeping network 5700 of the present closed-loop system 5000 is responsible for staging recycled polyester fabric products 2200, distributing recycled polyester fabric products to a plurality of rooms 2300, arranging recycled polyester fabric products in a plurality of rooms 2400, removing used recycled polyester fabric products from a plurality of rooms 2500, and/or segregating used recycled polyester fabric products 2520, as shown in the illustrative embodiment of the present method 2000 in FIG. 2.

A closed-loop system for the utilization of polyester fabric products in a high occupancy facility 5000, in accordance with at least one embodiment of the present invention, further comprises a dedicated compactor assembly 5800. A dedicated compactor assembly 5800 is an important component of the present closed-loop system for the utilization of polyester fabric products 5000 in order to assure a consistent and uncontaminated recycled fabric feedstock for the production of new recycled polyester fabric products 5300. In at least one other embodiment, a plurality of dedicated compactor assemblies 5800 may be employed at a single high occupancy facility 5600, wherein each of the plurality of dedicated compactor assemblies 5800 is utilized to compact a specific category of recycled polyester fabric products. By way of example, one dedicated compactor assembly 5800 is utilized solely for lightweight used polyester fabric products, such as, bed sheets and pillow cases, while another dedicated compactor assembly 5800 is utilized solely for used heavyweight polyester fabric products, for example, bath linens, including bath towels, hand towels, wash cloths, bath mats, etc. Alternatively, or in combination with a plurality of dedicated compactor assemblies employed at one or more high occupancy facility, and as noted above, one or more dedicated compactor may be employed at a dedicated manufacturing facility.

As briefly discussed above, dedicated compactor assemblies 5800 for compacting recyclable fabric products 5300 in accordance with at least one embodiment of the present closed loop system 5000 utilize encoded compactor bags 5820. More in particular, encoded compactor bags 5820 include information about the compacted recycled polyester fabric products 5300 contained therein after being compacted, such as, by way of example, the source, type, quantity, etc. Encoded compactor bags 5820 may also include information about a specific high occupancy facility 5600 in which the recycled polyester fabric products were compacted, the date compaction was completed, the person or person responsible for oversight of the same, etc. The information on an encoded compactor bag 5820 may be provided in the form of an RFID chip, a barcode or other optically scanned image, and/or it may further include hand written information physically marked onto a portion of the bag by a person overseeing the compaction process.

In at least one embodiment, encoded compactor bags 5820 are manufactured from the same fabric as the products to be compacted therein. As such, the entire encoded compactor bag 5820 and its compacted contents are processed as fabric feedstocks together in one step.

In one embodiment, each encoded compactor bag 5820 and its contents will pass through an X-ray at the designated manufacturing facility 5200, to further assure that no foreign contaminants or other objects have been inadvertently or intentionally disposed of in the encoded compactor bag 5820. In one further embodiment, and after clearing X-ray, the encoded compactor bag 5820 is passed through a bar code scanner after which the barcode is removed and the encoded compactor bag 5820 and its contents are fed into the recycling process.

In at least one embodiment, encoded compactor bags 5820 are provided with a corresponding shipment of new recycled polyester fabric products 5300 at the time they are distributed to each of a plurality of high occupancy facilities. In another embodiment, each high occupancy facility 5600 within a particular closed-loop system 5000 is provided with a plurality of encoded compactor bags 5820 specifically for use at that facility, such that the designated manufacturing facility 5200 can readily identify the source of incoming compacted polyester fabric products.

As will be appreciated by those of skill in the art, encoded compactor bags 5820 may be utilized as a form of inventory control in order to monitor the incoming recycled fabric feedstocks, by simply comparing the amount, for example, the weight, of new recycled polyester fabric products 5300 distributed to a particular high occupancy facility 5600 versus the amount, once again, for example, the weight, of compacted polyester fabric products collected from and returned by the same high occupancy facility 5600. In the event the difference between the amount provided and the amount returned by a particular high occupancy facility 5600 exceeds a predetermined threshold value over a specified period of time, an investigation is initiated to determine the source of the discrepancy, in order to maintain control over the incoming recycled fabric feedstocks. Thus, a further control measure assures purity of the recycled fabric feedstocks utilized to manufacture new polyester fabric products 5300, which is essential to maximize the economy of operation of the present closed-loop system 5000.

With reference once again to the illustrative embodiment of a closed-loop system for the utilization of polyester fabric products in a high occupancy facility 5000 of FIG. 3, a collection network 5900 collects compacted polyester fabric products from each of a plurality of high occupancy facilities 5600 for delivery to a designated manufacturing facility 5200, thereby closing the loop of the present closed-loop system for the utilization of polyester fabric products in a high occupancy facility 5000.

Similar to distribution network 5400, in at least one embodiment, a collection network 5900 comprises the shipping facilities, local and over the road trucks, etc., of a designated manufacturing facility 5200 for recycled polyester fabric products 5300. In at least one further embodiment, a collection network 5400 comprises one or more independent service companies to facilitate the collection of a plurality of compacted non-woven polyester fabric products 5300 from each of a plurality of high occupancy facilities 5600 located within a distribution network for a designated manufacturing facility 5200, such as, by way of example, a national waste and recycling company.

Now that the present inventive closed-loop method 2000 and closed-loop system 5000 have been described, attention is directed to the following tables which clearly demonstrate the significant reduction in water usage which may be attained upon implementation of the present inventive closed-loop method 2000 and closed-loop system 5000 for exemplary high occupancy facilities.

Table 1 below is illustrative of the calculation of the total square yardage of cotton fabric required for just the bed sheets and pillow cases in a typical high occupancy facility, such as a hotel or resort, having a total of 300 rooms, and the estimated amount of water required to manufacture and launder the same.

TABLE 1

| 300 Unit Facility Utilizing Cotton Fabric | | | |
|---|---|---|---|
| Description | Total-King | Total-Queen | Grand Total |
| Room Statistics: | | | |
| Number of Rooms | | | 300 |
| w/1 king size bed | | | 30% |
| w/2 queen size beds | | | 70% |
| Total King Size Beds | 90 | | 90 |
| Total Queen Size Beds | | 420 | 420 |
| Cotton Fabric Requirements - (Square Yards): | | | |
| King size bed sheets | 1,695 | | 1,695 |
| King size pillow cases | 277 | | 277 |
| Total - king size | 1,972 | | 1,972 |
| Queen size bed sheets | | 6,594 | 6,594 |
| Queen size pillow cases | | 1,024 | 1,024 |
| Total- queen size | | 7,618 | 7,618 |
| Total- king and queen size | | | 9,590 |
| 3-Par Supply | 5,918 | 22,856 | 28,774 |
| Water Requirements: | | | |
| Manufacturing[1]: | | | |
| Initial 3-Par Supply | | | 10,560,000 |
| 25% Annual Replacement | | | 2,640,000 |
| Laundering: | | | |
| Total Room Occupancy[2] | | | 82,125 |
| Total Pounds Linen[3], Annual | | | 492,750 |
| Total Gallons of Water[4], Annual | | | 1,230,000 |

[1]Assumes 367 gallons of water per square yard of cotton fabric
[2]Assumes 75% average occupancy per bed & average stay of 2 nights
[3]Assumes 6 pounds of used cotton fabric per room occupancy
[4]Assumes 2.5 gallons per pound to launder used cotton fabric As may be seen from Table 1, an assumption is made that 30 percent of the rooms will include a single king size bed, while the remaining 70 percent of the rooms will include two queen size beds. Further, the calculations in Table 1 are based on the following: a king size bed sheet has 9.42 square yards of cotton fabric; a king size pillow case has 1.54 square yards of cotton fabric; a queen size bed sheet has 7.85 square yards of cotton fabric; and, a standard pillow case has 1.22 square yards of cotton fabric. The calculations in Table 1 further assume 2 bed sheets and 2 pillow cases per bed. Based on the foregoing, the total square yards of cotton fabric required for each of the beds in the exemplary 300 room high occupancy facility is approximately 7,620 square yards. For a facility operating at 3-par, meaning, once again, a facility having three complete sets of bed sheets and pillow cases for each bed in the facility, the total square yards of cotton fabric required for the exemplary 300 bed high occupancy facility is approximately 28,774 square yards.

As further shown in Table 1, approximately 367 gallons of water is required to manufacture a single square yard of cotton fabric, and as such, a total of approximately 10,560,000 gallons of water is required just to manufacture an initial 3-Par supply of bed sheets and pillow cases for the exemplary 300 room high occupancy facility. Table 1 also shows that at a typical annual replacement rate of 25 percent for the bed sheets and pillow cases annually, an additional 2,640,000 gallons of water is required per year to manufacture the necessary replacement cotton bed sheets and pillow cases.

Looking further to Table 1, which once again is based on a typical high occupancy facility such as a hotel or resort having 300 rooms and an average annual occupancy rate of 75%, and assuming an average weight of 6 pounds of used cotton bed sheets and pillow cases generated per room occupancy, an additional amount of approximately 1,230,000 gallons of water are required annually in order to launder the cotton bed sheets and pillow cases in a typical 300 room high occupancy facility.

As will be appreciated from Table 1, based solely on the water required to replace 25% of the inventory and the water required to launder the cotton sheets and pillow cases utilized, nearly 4,000,000 gallons of water per year are required for the care and replacement of cotton bed sheets and pillow cases in a typical 300 room high occupancy facility, such as a hotel or resort. Adding in the amount of water required to manufacture an initial 3-par supply of cotton sheets and pillow cases, nearly 15 million gallons of water are required in just the first year of operation of a typical 300 unit high occupancy facility, which is an astounding 50,000 gallons of water per room per year.

By way of comparison, Table 2 below is illustrative of the calculation of the total square yardage of recycled non-woven fabric required for the bed sheets and pillow cases in the same typical high occupancy facility having a total of 300 rooms and the estimated amount of water required to initially manufacture and subsequently recycle the same.

TABLE 2

| 300 Unit Facility Utilizing Recycled Non-Woven Fabric | | | |
|---|---|---|---|
| Description | Total-King | Total-Queen | Grand Total |
| Room Statistics: | | | |
| Number of Rooms | | | 300 |
| w/1 king size bed | | | 30% |
| w/2 queen size beds | | | 70% |
| Total King Size Beds | 90 | | 90 |
| Total Queen Size Beds | | 420 | 420 |
| Recycled Non-Woven Fabric Requirements - (Square Yards): | | | |
| King size bed sheets | 1,695 | | 1,695 |
| King size pillow cases | 277 | | 277 |
| Total - king size | 1,972 | | 1,972 |
| Queen size bed sheets | | 6,594 | 6,594 |
| Queen size pillow cases | | 1,024 | 1,024 |
| Total- queen size | | 7,618 | 7,618 |
| Total- king and queen size | | | 9,590 |
| 3-Par Supply | 5,918 | 22,856 | 28,774 |
| Water Requirements: | | | |
| Initial Recycled Non-Woven Fabric Manufacture: | | | |
| Initial 3-Par Supply[1] | 651 | 2,514 | 3,165 |
| Annual Non-Woven | | | |

TABLE 2-continued

300 Unit Facility Utilizing Recycled Non-Woven Fabric

| Description | Total-King | Total-Queen | Grand Total |
|---|---|---|---|
| Fabric Replacement: | | | |
| Average Usage[2] | 12,318 | 57,487 | |
| NW Fabric Replacement | 270,027 | 1,042,823 | 1,312,851 |
| Water Requirement | | | 144,413 |

[1] Assumes 0.11 gallons of water per square yard of non-woven fabric
[2] Assumes 75% average occupancy per bed & average stay of 2 nights
[3] Assumes average usage × square yards per room As may be seen from Table 2, an assumption is once again made that 30 percent of the rooms will include a single king size bed, while the remaining 70 percent of the rooms will include two queen size beds. Further, the calculations in Table 2 are based on the following: a king size bed sheet has 9.42 square yards of recycled non-woven fabric; a king size pillow case has 1.54 square yards of recycled non-woven fabric; a queen size bed sheet has 7.85 square yards of recycled non-woven fabric; and, a standard pillow case has 1.22 square yards of recycled non-woven fabric. The calculations in Table 2 also assume 2 bed sheets and 2 pillow cases per bed. Based on the foregoing, the total square yards of recycled non-woven fabric required for each of the beds in the exemplary 300 room high occupancy facility is approximately 7,620 square yards, the same as the requirement for cotton fabric in the example of Table 1. For a facility operating at 3-par, meaning, once again, a facility having three complete sets of bed sheets and pillow cases for each bed in the facility, the total square yards of recycled non-woven fabric required for the exemplary 300 bed high occupancy facility is approximately 22,860 square yards, once again, the same as for cotton fabric in the example of Table 1.

Figure 4:
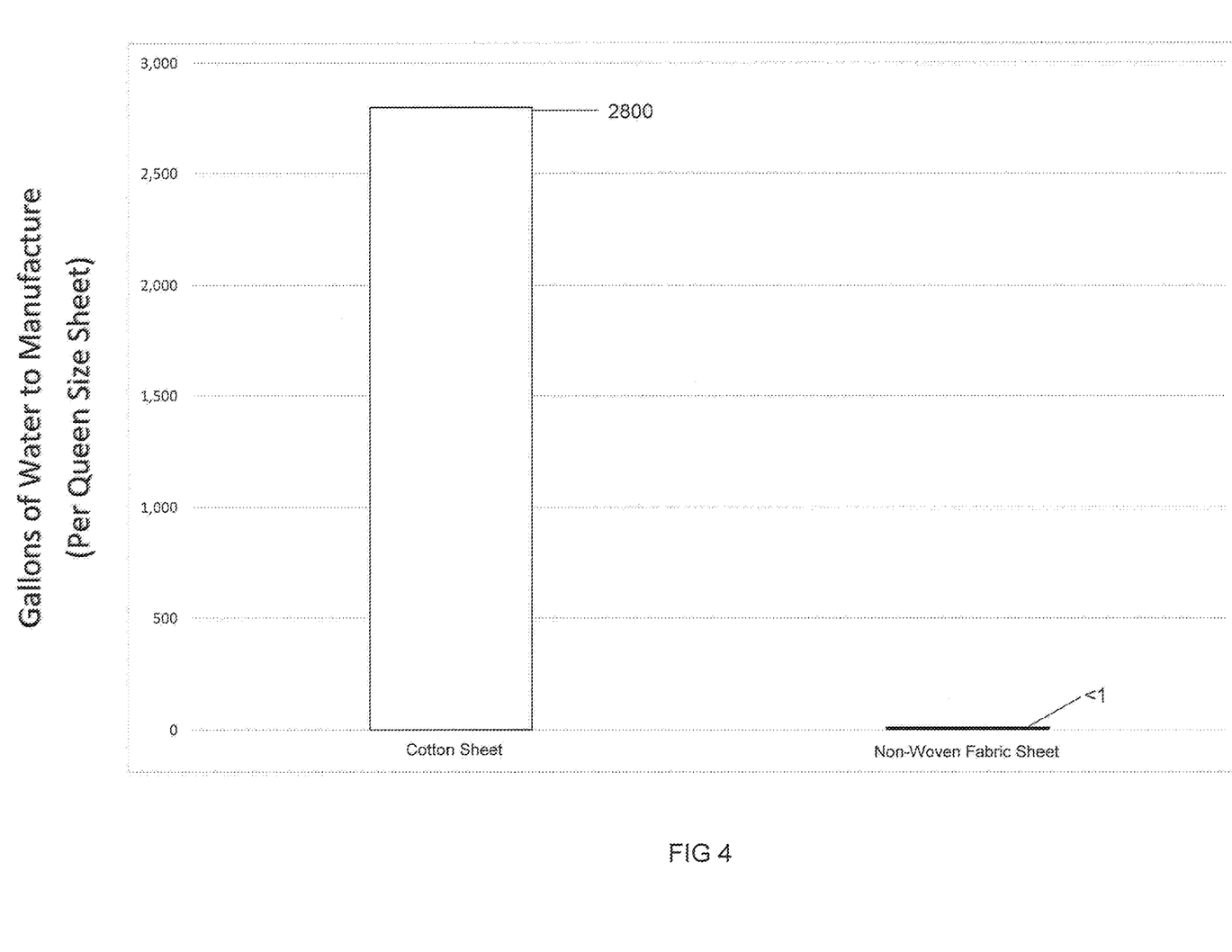
FIG. 4 is a graphic illustration of the amount of water required to manufacture a single queen size cotton sheet versus a single queen size recycled non-woven fabric sheet.

Of significance, and as shown in Table 2, less than one gallon of water is required to manufacture one square yard of recycled non-woven fabric. More in particular, a mere 0.11 gallons of water is required to manufacture each square yard of recycled non-woven fabric. Looking to FIG. 4, the huge disparity between the water requirements for the manufacture of cotton fabric versus recycled non-woven fabric are clearly displayed. Specifically, FIG. 4 shows that approximately 2,800 gallons of water are required to manufacture a single queen size cotton sheet, while less than one (1) gallon of water is required to manufacture the same queen size sheet from recycled non-woven fabric. This factor, in and of itself, is reason enough for high occupancy facilities to convert from the current prior art methodology to the inventive closed-loop method 2000 and closed-loop system 5000 of the present invention.

Turning once again to Table 2 above, just a little more than 3,000 gallons of water is required to manufacture an initial 3-Par supply of bed sheets and pillow cases for each bed in the exemplary 300 room high occupancy facility, which is just a little more than 10 gallons of water per room. Looking further to Table 2, which once again is based on a typical high occupancy facility such as a hotel or resort having 300 rooms, an average annual occupancy rate of 75%, and an average stay of 2 nights, a mere 144,413 gallons of water are required in order to replace the used non-woven fabric bed sheets and pillow cases annually, which is less than 500 gallons per room per year. Once again, this is in stark contrast to the nearly 50,000 gallons of water required per room when cotton fabric bed sheets and pillow cases are utilized, as was demonstrated in Table 1. Thus, the water savings which may be attained by implementing the present inventive closed-loop method 2000 and closed-loop system 5000 versus the cotton fabrics currently in use, are on the order of 100 to 1 during the first year of operation.

Table 3 below presents a summary of initial and annual water usage requirements for the exemplary 300 unit high occupancy facility of Tables 1 and 2, employing the present prior art method for utilizing cotton fabric products 1000 versus the present inventive closed-loop method 2000 and closed-loop system 5000 utilizing recycled non-woven ("NW") polyester fabric products for the same high occupancy facility.

TABLE 3

| Description: | Cotton Fabric − Recycled NW Fabric = Difference |
|---|---|
| Gallons of Water Required to Manufacture An Initial 3-Par Inventory: | 10,560,351 − 3,165 = 10,557,186 |
| Gallons of Water Required to Manufacture Replacements, Annual: | 2,640,087 − 144,413 = 2,495,674 |
| Gallons of Water Required to Launder Used Fabrics, Annual: | 1,231,875 − 0 = 1,231,875 |
| Total Gallons of Water Required, Annual: | 3,871,962 − 144,413 = 3,727,549 |

As is readily apparent from even a cursory review of Table 3, the volume of water which may be saved in the operation of a single mid-sized 300 unit hotel or resort by implementation of the present closed-loop method 2000 and closed-loop system 5000 is nearly 4 million gallons of water per year. Factor in the more than 10 million additional gallons of water required to manufacture an initial 3-Par inventory of just bed sheets and pillow cases for a single mid-sized 300 unit hotel or resort, and it will become apparent to those of skill in the art that implementation of the present inventive closed-loop method 2000 and closed-loop system 5000 on a larger scale, and the impact of the present invention on the present water crisis will prove to be measurable and significant.

More in particular, the calculation presented in Tables 1 and 2 above have been performed for the cities of Orlando and Las Vegas. The amount of water savings which may be realized annually in Orlando by implementing the present inventive closed-loop method 2000 and closed-loop system 5000 are in the range of 1.8 billion gallons, based on approximately 161,000 hotel rooms, 75 percent of the rooms having a single king size bed, an annual occupancy rate of 75%, and an average stay of 5 nights. Similarly, the amount of water savings which may be realized annually in Las Vegas by implementing the present inventive closed-loop method 2000 and closed-loop system 5000 is nearly 2 billion gallons, based on approximately 169,000 hotel rooms, 50 percent of the rooms having a single king size bed, an annual occupancy rate of 75%, and an average stay of 2 nights.

Extrapolation of this data to the nearly 5 million hotel rooms currently operating throughout the United States, it is estimated that nearly 200 billion gallons of unnecessary water usage per year can be eliminated.

In addition to the immense water savings which may be attained via the present invention, additional savings are realized at each high occupancy facility as the personnel, equipment, and supplies required to operate an industrial scale laundry facility, whether onsite or via a third party offsite, are eliminated. Also, the large volumes of harmful detergents, bleaches, and other cleaning compounds which are discharged daily into treatment systems worldwide may be significantly reduced as well via implementation of the present invention.

The significant water savings expected to be realized via implementation of the present invention presented in the illustrative examples of Tables 1 through 3 above are based on "non-woven" polyester fabric products, however, similarly significant water savings are also expected upon implementation of the present invention utilizing "woven" polyester fabric products.

Since many modifications, variations and changes in detail can be made to the described embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A closed-loop method for utilizing recycled polyester fabric products in a high occupancy facility, the method comprising:
   procuring a plurality of recycled polyester fabric products from a designated manufacturing facility,
   distributing the plurality of recycled polyester fabric products to a plurality of rooms in the high occupancy facility,
   removing a plurality of used polyester fabric products from the plurality of rooms,
   segregating the plurality of used polyester fabric products,
   recycling the plurality of used polyester fabric products wherein the plurality of used polyester fabric products are not laundered prior to said step of recycling such that the step of recycling the plurality of used polyester fabric products is used for sanitizing the used polyester fabric products, and
   manufacturing a plurality of recycled polyester fabric products at the designated manufacturing facility from the plurality of used polyester fabric products obtained solely from the high occupancy facility to maintain purity and consistency of the recycled polyester fabric feedstock.

2. The closed-loop method as recited in claim 1 wherein the polyester fabric products include bed sheets.

3. The closed-loop method as recited in claim 1 wherein the polyester fabric products include pillow cases.

4. The closed-loop method as recited in claim 1 wherein the polyester fabric products include bath towels.

5. The closed-loop method as recited in claim 1 wherein the polyester fabric products include wash cloths.

6. The closed-loop method as recited in claim 2 further comprising reducing a water usage for a 300 unit high occupancy facility by at least 1,000,000 gallons per year by utilizing recycled fabric bed sheets and pillow cases.

7. A closed-loop method for utilizing recycled polyester fabric products in a plurality of high occupancy facilities, the method comprising:
   procuring a plurality of recycled polyester fabric products for each of the plurality of high occupancy facilities from at least one designated manufacturing facility,
   staging a corresponding plurality of recycled polyester fabric products on a plurality of delivery carts at each of the plurality of high occupancy facilities,
   distributing the corresponding plurality of recycled polyester fabric products to a plurality of rooms at each of the plurality of high occupancy facilities,
   arranging the corresponding plurality of recycled polyester fabric products in the plurality of rooms at each of the plurality of high occupancy facilities,
   removing a corresponding plurality of used polyester fabric products from the plurality of rooms at each of the plurality of high occupancy facilities,
   segregating the corresponding plurality of used polyester fabric products at each of the plurality of high occupancy facilities,
   collecting a corresponding plurality of used polyester fabric products from each of the plurality of high occupancy facilities,
   recycling the plurality of used polyester fabric products from each of the plurality of high occupancy facilities wherein the plurality of used polyester fabric products are not laundered prior to said step of recycling such that the step of recycling the plurality of used polyester fabric products is used for sanitizing the used polyester fabric products,
   manufacturing a plurality of recycled polyester fabric products at the at least one designated manufacturing facility from the plurality of used recycled polyester fabric products obtained solely from each of the plurality of high occupancy to maintain purity and consistency of the recycled polyester fabric feedstock.

8. The closed-loop method as recited in claim 7 wherein recycling the plurality of used polyester fabric products comprises transporting the corresponding plurality of used polyester fabric products from each of the plurality of high occupancy facilities to the at least one designated manufacturing facility.

9. The closed-loop method as recited in claim 8 wherein recycling the plurality of used polyester fabric products further comprises processing the plurality of used polyester fabric products into recycled fabric feedstock.

10. A closed-loop system for the utilization of recycled polyester fabric products in a plurality of high occupancy facilities, the closed-loop system comprising:
    at least one designated manufacturing facility to manufacture a plurality of recycled polyester fabric products from a recycled fabric feedstock obtained solely from the plurality of high occupancy facilities,
    a distribution network to transport a plurality of recycled polyester fabric products to each of the plurality of high occupancy facilities,
    at least one delivery cart in each of the plurality of high occupancy facilities to facilitate distribution and arrangement of recycled polyester fabric products in a plurality of rooms in a corresponding high occupancy facility, and
    a collection network to transport a plurality of used polyester fabric products from each of the plurality of high occupancy facilities to the at least one designated manufacturing facility to maintain purity and consistency of the recycled polyester fabric feedstock without laundering said plurality of used polyester fabric products.

11. The closed-loop system as recited in claim 10 further comprising collecting used polyester fabric products from the plurality of rooms at the corresponding high occupancy facility.

12. The closed-loop system as recited in claim 10 further comprising compacting used polyester fabric products from the plurality of rooms at the corresponding high occupancy facility in a corresponding dedicated compactor assembly.

13. The closed-loop system as recited in claim 10 wherein the plurality of used polyester fabric products from each of the plurality of high occupancy facilities are processed into a recycled fabric feedstock.

14. The closed-loop system as recited in claim 10 wherein the polyester fabric products include bed sheets.

15. The closed-loop system as recited in claim 10 wherein the polyester fabric products include pillow cases.

16. The closed-loop system as recited in claim 10 wherein the polyester fabric products include bath towels.

17. The closed-loop system as recited in claim 10 wherein the polyester fabric products include wash cloths.

18. The closed-loop system as recited in claim 14 further comprising reducing a water usage for a 300 unit high occupancy facility by at least 1,000,000 gallons per year by utilizing recycled fabric bed sheets and pillow cases.

19. The closed-loop system as recited in claim 14 further comprising reducing a water usage for a 300 unit high occupancy facility by at least 3,500,000 gallons per year by utilizing recycled fabric bed sheets and pillow cases.

* * * * *